US007329178B1

(12) United States Patent
Moore et al.

(10) Patent No.: US 7,329,178 B1
(45) Date of Patent: Feb. 12, 2008

(54) BLACKJACK GAME WITH DISCARD OPTION

(76) Inventors: James Chyvan Moore, 5001 S. Hickory Ave., Apt. 205, Broken Arrow, OK (US) 74011-4613; Ann Marie D'Amico, 79 San Simeon Dr., Palm Springs, CA (US) 92264-5237

( * ) Notice: Subject to any disclaimer, the term of this patent is extended or adjusted under 35 U.S.C. 154(b) by 0 days.

(21) Appl. No.: 11/468,042

(22) Filed: Aug. 29, 2006

Related U.S. Application Data

(63) Continuation-in-part of application No. 10/811,942, filed on Mar. 30, 2004, now abandoned.

(60) Provisional application No. 60/507,730, filed on Oct. 1, 2003.

(51) Int. Cl.
*A63F 1/00* (2006.01)
*A63F 13/00* (2006.01)

(52) U.S. Cl. ......................... 463/12; 273/292; 273/274

(58) Field of Classification Search ................ 273/292, 273/274, 309; 463/13, 12
See application file for complete search history.

(56) References Cited

U.S. PATENT DOCUMENTS 4,861,041 A 8/1989 Jones et al.
5,407,209 A 4/1995 Prorost
5,660,392 A 8/1997 Hansen
5,743,532 A 4/1998 Lafferty
5,823,536 A 10/1998 Flasch
5,979,897 A 11/1999 Grossman
5,984,308 A 11/1999 Herrmann
6,293,551 B1 9/2001 Webb
6,375,190 B1 4/2002 Kocher
6,394,456 B1 5/2002 Long
6,485,020 B1 11/2002 Broadnax
6,540,230 B1 4/2003 Walker et al.
6,877,746 B1 4/2005 Herren et al.
2003/0104851 A1 6/2003 Merari
2003/0139211 A1 7/2003 Mostashari

FOREIGN PATENT DOCUMENTS

EP 0 338 644 10/1989

*Primary Examiner*—Benjamin Layno
(74) *Attorney, Agent, or Firm*—Stephen Christopher Swift; Swift Law Office

(57) ABSTRACT

A new version of the game of blackjack, in which players may discard one of the two cards that they are initially dealt, if they pay a discard fee before any cards are dealt. The player who discards then draws another card to replace the card that has been discarded. The discard fee is preferably a percentage of the amount that the player has bet. The discard option is preferably limited to players who do not have an ace in their initial hand, and who have an initial hand with a point value of sixteen or less. If the dealer has a blackjack, a player who has an ace or card with a value of ten in his or her initial hand, and has paid the discard fee, may discard the other card and draw a replacement card. If the player then has a blackjack, they win the hand.

18 Claims, 3 Drawing Sheets

| Basic Group | Player's Hand | Possible Hands Out of 1,326 | |
|---|---|---|---|
| Made Hand | Blackjack | 64 | |
| Made Hand | Hard 20 | 120 | Made Hands |
| Made Hand | Hard 19 | 64 | 446 |
| Made Hand | Hard 18 | 70 | 33.64% |
| Made Hand | Hard 17 | 80 | |
| Bust Draw Hand | Hard 16 | 86 | |
| Bust Draw Hand | Hard 15 | 96 | Bust Draw Hands |
| Bust Draw Hand | Hard 14 | 102 | 514 |
| Bust Draw Hand | Hard 13 | 112 | 38.76% |
| Bust Draw Hand | Hard 12 | 118 | |
| Free Draw Hand | Hard 11 | 64 | |
| Free Draw Hand | Hard 10 | 54 | |
| Free Draw Hand | Hard 9 | 48 | Free Draw Hands |
| Free Draw Hand | Hard 8 | 38 | 366 |
| Free Draw Hand | Hard 7 | 32 | 27.60% |
| Free Draw Hand | Hard 6 | 22 | |
| Free Draw Hand | Hard 5 | 16 | |
| Free Draw Hand | Hard 4 | 6 | |
| Made Hand | Soft 20 | 16 | |
| Made Hand | Soft 19 | 16 | |
| Made Hand | Soft 18 | 16 | |
| Free Draw Hand | Soft 17 | 16 | |
| Free Draw Hand | Soft 16 | 16 | |
| Free Draw Hand | Soft 15 | 16 | |
| Free Draw Hand | Soft 14 | 16 | |
| Free Draw Hand | Soft 13 | 16 | |
| Free Draw Hand | Soft 12 (2 aces) | 6 | |

FIG. 1

BLACKJACK GAME WITH DISCARD OPTION

CROSS REFERENCE TO RELATED APPLICATION

This application is a Continuation In Part of U.S. patent application Ser. No. 10/811,942, filed on Mar. 30, 2004 now abandoned, which was based on Provisional Patent Application Ser. No. 60/507,730, filed Oct. 1, 2003, and claimed, in a separate letter filed on Mar. 30, 2004, the benefit of Disclosure Document No. 535764, received in the U.S. Patent & Trademark Office on Aug. 4, 2003, all of which are incorporated herein by reference.

BACKGROUND OF THE INVENTION

1. Field of the Invention

The present invention relates to methods of dealing and playing blackjack card games.

2. Description of the Prior Art

"Blackjack" (also called "twenty one") has been and still remains the most popular casino table game ever played.

Players are required to play their hand against the dealer's hand. The game is often referred to as "twenty one" because the object of the game is to acquire a total hand value as close to twenty-one as possible without exceeding twenty-one.

Every card having a rank from two to ten is given a value equal to the number of its rank. "Court" or "face" cards (Jacks, Queens and Kings) have a value of ten. An ace has a value of either one or eleven (depending on which number will allow the player to get as close to twenty-one as possible, without going over and thereby "busting".

The dealer starts by dealing each player (and himself) two cards from a standard deck of 52 playing cards (having four cards of each of the 13 ranks mentioned in the preceding paragraph, with one card of each of four suits in each rank, the four suits being spades, hearts, diamonds and clubs). One of the two cards initially dealt to the dealer (called the "up card") is placed face up, and the other card is placed face down. Players may choose to draw additional cards in attempting to acquire a total as close to 21 as possible without "busting" (exceeding 21). A busted hand loses immediately. A starting hand with a total value of 21 (e.g., an ace and a ten) is called a "blackjack".

While players may stop drawing at any time, the dealer is required to draw until his total is 17 or more. If both the dealer and a player bust, the dealer wins, as the player must draw first and will lose immediately when busting.

Hands that contain an ace and cannot bust (go over 21) on the next card drawn are called "soft". Other hands are called "hard". Hands are also referred to by their total point value. E.g., a 6 and a 7 would be a "hard 13", while a 6 and an ace would be a "soft 17".

Once a player acquires a hard total of 12. They are in danger of busting if they draw additional cards. Hard 13, 14, 15 and 16 also fall in this category. Hereafter, such hands will be referred to as "bust draws".

As the dealer only shows one card of his two card starting hand, every player faces a dilemma once they have a bust draw: Should they draw and risk busting or stand and hope that the dealer busts?

FIG. 1 is a chart that shows three different classifications for the possible two-card starting hands in a single deck. In a player's original two cards there are 1,326 possible hands that they can receive in a standard 52 card deck. FIG. 1 shows the number of possible ways there are of receiving each hand. Dividing the number of possible ways by 1,326 and multiplying by 100% gives the average percentage of time you should receive each hand.

FIG. 1 shows bust draw hands to be the most frequent, with an average of 514 hand received per 1326 possibilities or almost 39% of all starting hands received. It is always possible to bust any of these hands with a single draw.

The second most frequent group of hands are the "made hands" with an average of 446 starting hands in the 1326 possibilities or a most 34% of all possible starting hands. These hands include all totals of hard 17 or more and soft hands of 18 or more. With the possible exception of soft 18, all these made hands should stand "as is". Any draws to these hands will severely weaken the player's chance to win the hand. Thus, their hand is "made".

The smallest group of starting hands are "free draw" hands, so-called because players can freely draw at least one and sometimes more additional cards without risk of busting. Free draw hands include hard totals of 11 or less and soft totals of 17 or less. These hands average 366 starting hands of the 1,326 possibilities in a single deck; less than 28% of all possible starting hands.

Because players simply stand on "made hands" and fear busting their "bust draws", most of the fun, action and excitement for players lie in the "free draw" group of hands. The reason is simple. Players can act on these hands every time by freely drawing at least one card. Better yet, one draw has the possibility of turning 88% of these "free draw" hands into "made hands". This induces all two-card totals of hard 7, 8, 9, 10 and 11.

It also includes all soft hands of 12, 13, 14, 15, 16 and 17. A small card can make the hand, as the ace can be given a value of eleven. A large card cannot bust the hand, as the ace would then be revert to a value of one. Drawing and making these hands and never risking busting can be fun. But players find little joy in continually making tough decisions on their "bust draws".

These "free draws" offer some profitable "double down" opportunities with the hard totals of 11, 10 and 9. The chance to double your bet and take only one card exists only in free draw hands. Doubling down on made hands and bust draw hands would be pure foolishness.

Another fun feature of free draw hands lies in the chance to turn small free draw hands of 8 or less into better free draw hands such as 10 or 11. Free draw hands are the only group of hands to provide action for the player on every hand.

In the past few years, many side bets have been created based on the first two cards received by the players in blackjack games. While these bets may create a little more amusement for the players, they have no effect on the outcome of the player's hands. The bad starting hands are still bad starting hands. The ever-present "bust draws" are still prevalent. The stress of decisions never diminish, and the dealer's up card still appears ominous more often than not.

While frequent "bust draws" in the first two cards can be very discouraging, there is one thing worse for the player. The dealer receives a blackjack! While "bust draws" occur almost eight times as often, the fear of that dealer's blackjack is always present.

There have been numerous variations of the popular casino card game called "blackjack" or "twenty one" but none that are equivalent to the present invention.

U.S. Pat. No. 4,861,041, issued on Aug. 29, 1989 to Daniel A. Jones and James P. Shuttle, discloses adding a progressive jackpot component to a live casino table game. It requires an additional wager by players at the beginning of each hand in an attempt to win all or part of a progressive jackpot created by these wagers. It should be noted that this is an extra bet, and is not a discard fee as in the present invention. Also, this patent is not specifically directed to blackjack games, unlike the present invention. As is the case with discard fees in blackjack, this progressive jackpot feature could never be profitable for the house if the bets were placed after the hands were dealt.

U.S. Pat. No. 5,407,209, issued on Apr. 18, 1995, to Phillip P. Prerost, discloses a modification to blackjack, in which, after the first two cards are dealt, if the player decides to take a third card, he is given the option of replacing the third card. The player must make a second bet to replace the third card. The present invention is distinguishable, since the optional discard fee must be paid before any cards are dealt, and the player can only discard one of the two original cards.

U.S. Pat. No. 5,660,392, issued on Aug. 26, 1997, to Brian S. Hansen, discloses a method for playing a blackjack type card game, in which the player makes an additional wager, the cards are dealt one at a time, and the player has the option of making an additional wager after each card is dealt. The instant invention is distinguishable, in that it allows a player to discard a card that has been dealt, if a fee is paid in advance.

U.S. Pat. No. 5,743,532, issued on Apr. 28, 1998, to William M. Lafferty, discloses a method of making a side bet during blackjack. The player has the option of betting that the dealer has an ace.

U.S. Pat. No. 5,823,536, issued on Oct. 20, 1998, to Lea Flasch, discloses a blackjack card game and method of playing a game, in which each player, in turn, is offered the role of banker until a first player accepts.

U.S. Pat. No. 5,979,897, issued on Nov. 9, 1999, to Howard Francis Grossman, discloses a method of playing blackjack, in which various side bets are allowed to increase the excitement of playing.

U.S. Pat. No. 5,984,308, issued on Nov. 16, 1999, to Delores Hermann, discloses a variation of blackjack, allowing an optional bonus bet that the dealer will not exceed the player's point count total.

U.S. Pat. No. 6,293,551, issued on Sep. 25, 2001, to Derek J. Webb, discloses a blackjack card game incorporating two-card 21 wagers. A first card is dealt to a player and a first card is dealt to the dealer. If the player's first card is an ace or 10-value card, the player has the option of betting that his or her two-card total will be 21. If the dealer's first card is an ace or 10-value card, the player has the option of betting that the dealer's two-card total will be 21.

U.S. Pat. No. 6,375,190, issued on Apr. 23, 2002, to Robert William Kocher, discloses a game of blackjack allowing the player to take two extra cards ("double-hit") or three extra cards ("triple-hit"). The instant invention is distinguishable, in that it allows the players to discard a card.

U.S. Pat. No. 6,394,456, issued on May 28, 2002, to George M. Long, discloses a method of playing a variation of the card game "twenty-one", in which a player who is dealt a pair may "split" the pair, and be dealt additional cards to form two hands, each of which contains one card from the pair that is split.

U.S. Pat. No. 6,485,020, issued on Nov. 26, 2002, to John Broadnax, discloses a casino card game involving optional variations of blackjack. The game allows a player to replace one of the first two cards dealt. The instant invention is distinguishable, in that it allows one of the first two cards dealt to be replaced only if the player pays a fee in advance, and it does not allow either card to be replaced if at least one of them is an ace. In Broadnax, players are usually required to match their original bet with a second bet. When a player places the second bet, the dealer takes down the original bet, which is forfeited, and replaces the unwanted card with another card. (There is no mention of this forfeit rule in the basic rules, but only under the "EXAMPLES OF OPTION USE" in column 5. The final resolution of the forfeited bet is never fully explained.) Under "REVIEW OF RULES", Column 6, lines 7 9 state, "6. Pushes—all bets forfeited by the player because he chose to use an option will remain forfeited in the event of a push with the dealer." The language of claim 8 is almost identical. It could be assumed that the player would also forfeit the first bet if he loses the second bet. If the player wins the second bet, what becomes of the forfeited bet! Apparently it will still be forfeited, for nothing in the patent states otherwise.

When the forfeit rule applies in Broadnax, it appears that the player will always be risking the loss of two bet to win one, if they use the discard option. Since this rule applies to options one, two and four (in column 3) using discard options on any of these three options will create huge losses for the unwise player. Option four offers the player a second chance: When the player draws a bust card, they may replace that card with a second bet to that some bust draw again with an average 30% win chance. If any player exercises these options, how long are they likely to last at the gaming table!

Broadnax's option three (in column 3) allows the player a change to draw a second double down card, but only if the player's first double down hand totals 20 or 21 and the dealer has an ace or face card showing. The only correct double down in option three is hard 11 against an ace or ten card. This chance should be received only about once in 140 hands. Broadnax offers foolish players a quick way to lose their money, if they choose to play these complicated options.

U.S. Pat. No. 6,540,230, issued on Apr. 1, 2003, to Jay S. Walker et al., discloses a method and apparatus for playing a card game such as blackjack, including "bust insurance" and "mortgage" options. The options may be selected after the first two cards are dealt. There is no option for discarding a card, as in the instant invention.

U.S. Pat. No. 6,877,746, issued on Apr. 12, 2005, to Jerry Herren and Joanie N. Herren, discloses a live or electronically implemented blackjack game, in which players may exchange one or both of the two cards that they are originally dealt, in exchange for a fee that is paid after the cards are dealt. In a first embodiment, the fee is fifty percent of the player's original wager. This gives the players an advantage over the house, which is increased by allowing a player to double down on their lone remaining card, such as a lone ten. These rules can allow a player to gain a 2.71% edge with optimum play, as will be explained. Changing the payouts for blackjack as suggested in Herren's FIG. 3 is not a new ideal with Herren. Even money was paid for blackjacks by the casinos in "face-up" blackjack for many years. Both dealer cards were dealt face up, with the dealer winning all pushes for allowing players to see both cards in dealer's starting hands. There is nothing to stop casinos from paying even money for blackjacks, if players are foolish enough to play such a game. Some casinos have already reduced their blackjack payouts, particularly the 6 to 5 payouts, which has caused the players' winnings to decline.

To summarize, Herren et al. permits the player to exchange one or both of their two starting cards by paying an exchange fee equal to 50% of their original bet. The player may exchange one card only and choose to double down on his one remaining card, or he may exchange both cards but not double down on his new two-card hand. Alternatively, the player may split his original two cards by placing an additional bet. The player may then exchange each new card dealt to each separate hand, paying a fifty percent fee for each exchange. The main objective of the game seems a little unclear. It would seem to be a confusing game to play or deal. A tentative analysis of how the game should be played follows:

If the player chooses to pay a fifty percent fee to exchange one card, then the player's action should increase his chances at winning by at least fifty percent. This would include the five worst player starting hands of hard 16, 15, 14, 13, and 12, in addition to hard 17. The best exchange hand is player's 0-6 versus dealer's 7. Hard 16 would average losing 41.5% against the 7. A lone ten doubling down on an exchange draw would average winning 39.7% or a total gain of 80.7% when paying the fifty percent fee. The net gain is 30.7%, i.e., a win of 30.7 bets per 100 plays of this particular play. The following is a summary of the positive plays:

| EXCHANGE HAND | PLAYER GAIN |
|---|---|
| 10-6 vs. All dealer up cards | +0.69% |
| 10-5 vs. All up cards | +0.58% |
| 10-4 vs. Dealer 9 or less | +0.47% |
| 10-3 vs. 9 or less | +0.42% |
| 10-2 vs. 8 or less | +0.35% |
| 10-7 vs. All up cards except 10, 9 and 7 | +0.20% |
| TOTAL GAIN | +2.71% |

The player should exchange the smaller card and always double down on the lone ten against dealer's nine or less. The player should only use the exchange fee for the starting hands listed above, to gain a 2.71% edge over the house. For other starting hands the 50% fee is mildly excessive to extremely excessive, and should never be used.

U.S. patent application Ser. No. 2003/0104851, published on Jun. 5, 2003, to Naftali Merari, discloses an apparatus and method of playing twenty one, in which a player may discard the cards that are initially dealt, which are then replaced with new cards. Again, the instant invention is distinguishable, in that it allows one of the first two cards dealt to be replaced only if the player pays a fee in advance, and it does not allow either card to be replaced if at least one of them is an ace.

U.S. patent application Ser. No. 2003/0139211, published on Jul. 24, 2003, to Moe Mestashar, discloses a "no bust" 21 or blackjack game, in which a player has an option of having the dealer replace a draw card that causes the player's hand to "bust" by exceeding 21 points. (A "draw card" is a card that is drawn by the player after the first two cards are dealt.) The instant invention is distinguishable, in that it allows one of the cards that are initially dealt to be replaced.

European Patent Application Publication No. 0 338 644, published on Oct. 25, 1989, inventors James Patrick Suttle and Daniel Aloysius Jones, discloses an apparatus for progressive jackpot gaming, that may be used with games such as twenty one or poker.

None of the above inventions and patents, taken either singly or in combination, is soon to describe the instant invention as claimed.

SUMMARY OF THE INVENTION

The present invention is a new version of the game of blackjack, that offers more to the players than current side bets provide. For a pre-paid fee, every player is given a change to transform all original "bust draw" hands into "free draw" hands. This produces very startling results, by enabling players to double or triple their chances to win the hand. The fee allows all players to discard a card from all hard hands of 16 or less, if they choose. By discarding properly from their "bust draw" hands, no hand can be busted with the first draw, yet almost 99% of the time it is possible to achieve a "made hand" with that first card. Currently, players have unlucky streaks, receiving far more than their share of "bust draws" and busting them with the first card drawn. With the discard option, no hand can be busted with less than two cards. Any player's losing streaks should be less frequent and much shorter under these conditions.

The discard option also offers players a limited chance to beat the dealer's blackjack with certain two-card starting hands. These starting hands should occur over 57% of the time, giving the player a chance to draw against the dealer's blackjack. Any chance to beat the dealer's blackjack should be enticing to players.

Accordingly, it is a principal object of the invention to provide a new version of the game of blackjack that will increase the players' fun and excitement, while allowing them to win over fifty percent of all their starting hands.

It is another object of the invention to reduce blackjack players' sense of frustration, by giving them a second chance by allowing them to discard one card in a bust draw hand.

It is a further object of the invention to further reduce blackjack players' anxiety, by allowing them to draw against a dealer's blackjack.

Still another object of the invention is to provide a means of increasing business for casinos, by increasing interest in the game of blackjack.

It is an object of the invention to provide improved elements and arrangements thereof in a method for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a chart providing information about different hands that may be dealt in the game of blackjack.

Similar reference characters denote corresponding features consistently throughout the attached drawings.

DETAILED DESCRIPTION OF THE PREFERRED EMBODIMENT

The present invention is a variation of the regular Blackjack game currently in play at most casinos. In a first embodiment, it is played with physical cards. It gives players an option to place a preset fee, before any cards are dealt, which allows the player to discard one card from their two-card starting hand of hard 16 or less. Soft hands are not eligible for the option (except as noted below).

Figure 2:
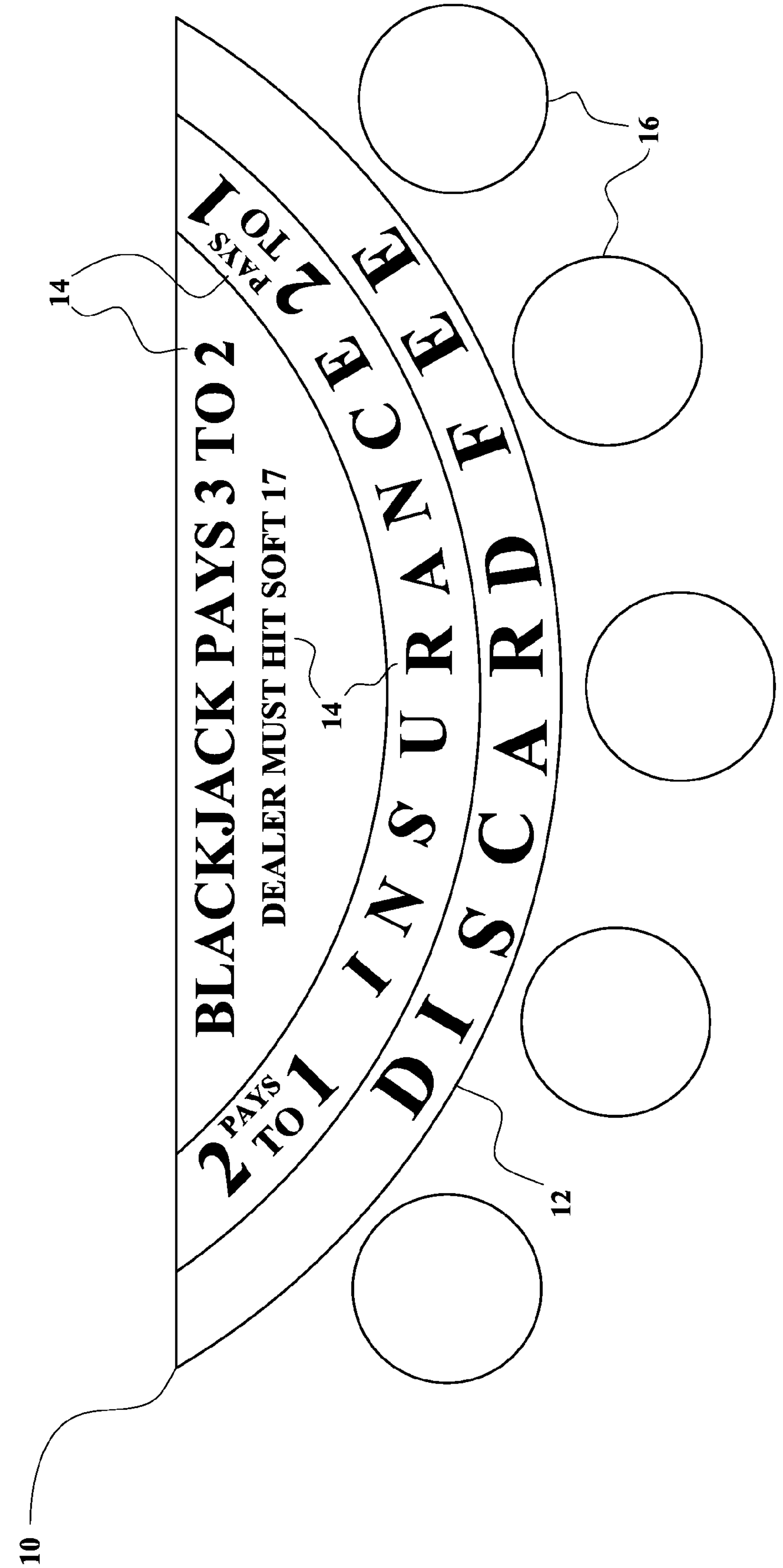
FIG. 2 is a diagrammatic top plan view of a table that may be used for the first embodiment of the invention.

The discard fee is preferably a flat twenty percent of a player's initial bet on the game. (The initial bet must be placed before any cards are dealt.) The fee is optional for all players. FIG. 2 depicts a regular blackjack table layout 10 with a special line 12 for placement of the players' discard fees. Also shown are typical indicia 14 that might appear on the playing table and seats 16 for the players.

Each player who has paid the discard fee makes her decision whether or not to discard when it is their turn to act on their hand. If the player chooses to discard, the next card off the deck will be their replacement card. The new two-card hand will be their official starting hand. Such a hand containing an ace and a 10 would be considered a blackjack, but will only be paid even money. Any double down must be on the two card hand. After a player receives their replacement card, they would proceed to complete their hand according to the preestablished blackjack rules of the casino or other gaming venue.

The preferred embodiment of the invention permits players to draw for a "super-blackjack" under certain conditions. When the dealer has a blackjack, a player may draw to any ace or card having a value of ten (10, Jack, Queen or King) in their starting hand in an attempt to make a "super-blackjack". A successful draw will pay $3 for every $2 bet, instead of losing the hand? (Players may exercise this option only if they have paid the optional discard fee before any cards are dealt, and they must discard one of their two original cards. Note that this is the only circumstance in which players having a "soft hand" (i.e., a hand with an ace counted as eleven) may exercise the discard option.) When used properly, the optional discard fee greatly increases the player's chance to win the hand. Some discards are more effective than others, but most proper plays will increase the player's overall chances to win more often than lose. The following are some general guidelines for discarding properly:

1. Always discard the smaller card from hard 12 through 16.
2. Always discard the larger card from 4 through 7.
3. Rules for Pairs:
   - 8-8: Always discard except when spitting against 3,4, 5,6 or 7.
   - 7-7: Always discard except when splitting against 6.
   - 6-6: Always discard except when splitting against 6.
   - 3-3: Always discard except when splitting against 4, 5 or 6.
   - 2-2: Always discard except when splitting against 3, 4, 5 or 6.

By charging a 20% discard fee before any cards are dealt, the present invention creates an instant 20% advantage for the house at the start. Players who follow the general guidelines for discarding can win an extra 210 bets power 1326 plays (or 15.84% against the house) reducing the house advantage to 4.16%. The chance of a super-blackjack will further reduce the house advantage to 3.73%, which is still a very satisfactory edge for the house. A 20% discard fee can easily be calculated by the dealer (e.g., one dollar per five dollars bet). None of the foregoing attractive features for players and the house could possibly be achieved by charging any set discard fee after the starting hands are dealt?

The discard feature has the following effects:

1. All player's two-card bust draws can be converted into one-card free draws. It is then possible for 99% of these hands to become a made hand with one additional card, without fear of busting. Over six times out of ten these draws will be to a single ten.

2. Converting bust draws to free draws will create 66% free draws at the start. Players will have the secure feeling of taking at least one card to these hands without fear of busting.

3. When the dealer has a blackjack, the above-mentioned special discard rule provides the player a chance to draw to a "super blackjack" to beat the dealer's blackjack. Player will average over a 57% chance to have such a draw.

4. It should always take at least two cards to bust any player's hand (except for made hands, of course).

Players who follow these rules may win against the bank in 58% of their blackjack games. However, the house will still make money, because it always retains the optional discard fee of 20% of the amount bet by the players before any cards are dealt, whether the players exercise the discard option or not. That players can win the majority of their blackjack hands, while the house still makes money, is an unexpected result that indicates that the present invention is not an obvious modification of the prior art. The payout to the player if he wins is:

- 3 to 2 if he wins with a blackjack in the first two cards that he is dealt, before having made any discard;
- 3 to 2 if he wins with a super-blackjack;
- even money if he wins with a blackjack after discarding; and
- even money if he wins without a blackjack.

The player may exercise choices permitted by the host casino, such as doubling down, splitting pairs, and surrender. In doubling down, after the cards are dealt, the player decides to double the amount of his bet. In splitting pairs, when a player is dealt two cards of the same rank, he may decide to separate the pair into two hands, and a second card is then dealt to complete each hand. In surrender, after the first two starting cards are dealt to both the player and the dealer, with one of the dealer's cards face up and the other face down, before any additional cards are dealt the player may "surrender" and receive half of his bet back. (Only a few casinos still allow surrender.)

General guidelines for discarding (as described above) may be made available to the players upon request, and said general guidelines can enable the player to win the majority (specifically, over 58%) of his bets through optimum use of the optional discard fee.

Figure 3:
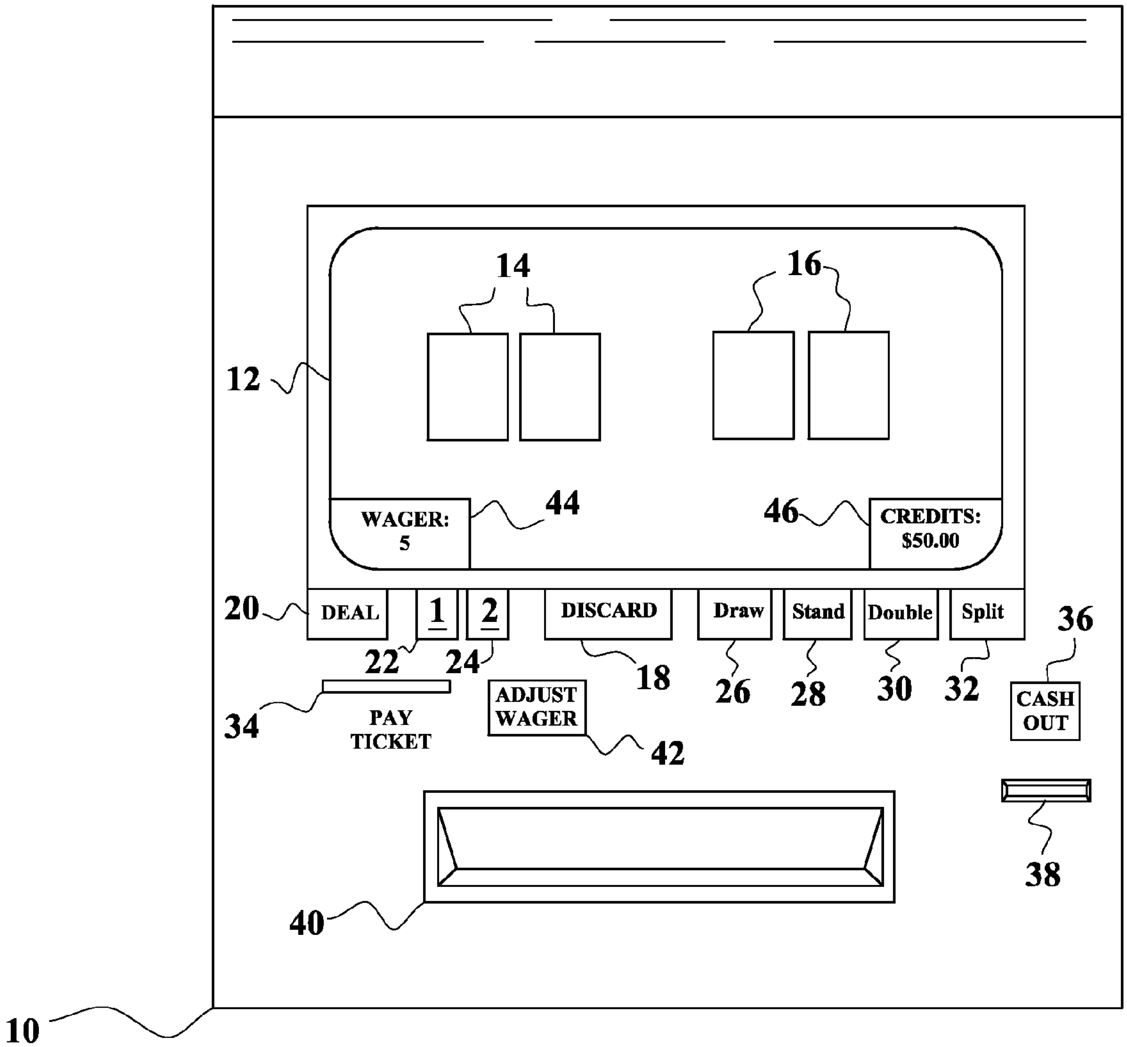
FIG. 3 is a front elevational view of a gaming machine on which the second embodiment of the game may be played.

Alternatively, in the second embodiment of the invention, the game may be played electronically, with the cards being represented on the display screen of an electronic device, as shown in FIG. 3. An electronic gaming machine 10 has a display screen 12, with a player display area 14 for the player's cards, and a dealer display area 16 for the dealer's cards. Player control functions are directly below the screen. If the player chooses to use the discard option, he must first push the "discard" button 18 and then the "deal" button 20. If the player desires to discard from his two card initial starting hand, he must designate the first card (displayed on the left) by pushing button number one 22, or the second card (displayed on the right) by pushing button number two 24. Then the system causes the selected card to be replaced at once. The player may then push the "draw" button 26 to draw another card, the "stand" button 28 to not draw another card, the "double" button 30 to double down (double their bet), or the "split" button 32 to split a pair. Below the screen are the pay ticket dispenser slot 34, the cash out button 36, the currency reception slot 38 (within which is a bill validator), the currency dispensing slot 40, and the "adjust wager" button 42. In the bottom left hand corner of the screen is the wager display area 44, showing the amount of the wager. In the bottom right hand corner of the screen is the credit display area 46, showing the amount of wins and losses. A processor (not shown in the drawings) for controlling the electronic blackjack game may be located within the same unit as the display, or the processor may be a server located at a distance from the display. The machine shown in FIG. 3 is for illustration only. The present invention includes any machine within the scope of the claims.

It is to be understood that the present invention is not limited to the embodiments described above, but encompasses any and all embodiments within the scope of the following claims.

We claim:

1. A method of playing a blackjack card game, comprising the steps of:

accepting a bet from a player, before any cards are dealt;

accepting an optional discard fee, if the player chooses to pay the optional discard fee, before any cards are dealt;

dealing two cards to the player and two cards to the dealer;

allowing the player to discard one of his two cards, if the player has paid the optional discard fee and chooses to discard the card;

dealing a replacement card to the player, if the player has discarded a card, with the card originally dealt and the replacement card counting as the player's starting hand, and counting as a blackjack if it has a value of twenty-one;

completing the blackjack game pursuant to preestablished rules of the blackjack game; and if the player wins, paying off the player pursuant to preestablished payouts;

wherein the player who has paid the optional discard fee may discard one card only if the value of the first two cards that the player is dealt is less than seventeen and neither card is an ace; and unless the dealer's starting two-card hand is a blackjack and the player has at least one card selected from the group consisting of aces and cards with a value of ten, in which case the player may discard one card and draw one card only, and if the player's hand then has a value of twenty-one, it is a super-blackjack that wins against the dealer's blackjack.

2. The method of playing a blackjack card game according to claim 1, wherein the optional discard fee is a preset percentage of the player's bet.

3. The method of playing a blackjack card game according to claim 2, wherein the optional discard fee is twenty percent of the player's bet.

4. The method of playing a blackjack card game according to claim 1, wherein the optional discard fee is always retained by the house, even if the player does not discard.

5. The method of playing a blackjack card game according to claim 1, wherein the payout to the player if he wins is:

3 to 2 if he wins with a blackjack in the first two cards that he is dealt, before having made any discard;

3 to 2 if he wins with a super-blackjack, that is, a blackjack that he gets after the dealer gets a blackjack;

even money if he wins with a blackjack after discarding; and even money if he wins without a blackjack.

6. The method of playing a blackjack card game according to claim 1, wherein the player may exercise choices permitted by a host casino, selected from the group comprising doubling down, splitting pairs, and surrender.

7. The method of playing a blackjack card game according to claim 1, wherein general guidelines for discarding are made available to the player upon request, and said general guidelines enable the player to win the majority of his bets through optimum use of the optional discard fee.

8. An electronically implemented method of playing a blackjack card game, comprising the steps of:

accepting a bet from a player, before any cards are displayed;

accepting an optional discard fee, if the player chooses to pay the optional discard fee, before any cards are displayed;

displaying two player cards face up and displaying two cards of a simulated dealer;

allowing the player to exchange one of his two displayed cards with remaining cards in one or more simulated decks of playing cards, if the player has paid the optional discard fee and chooses to discard the card;

displaying a replacement card to the player, if the player has discarded a card, with the card originally displayed and the replacement card counting as the player's starting hand, and counting as a blackjack if it has a value of twenty-one;

completing the blackjack game pursuant to preestablished rules of the blackjack game; and if the player wins, paying off the player pursuant to preestablished payouts;

wherein the player who has paid the optional discard fee may exchange one card only if the value of the first two player cards displayed is less than seventeen and neither card is an ace; and unless the simulated dealer's starting two-card hand is a blackjack and the player has at least one card selected from the group consisting of aces and cards with a value of ten, in which case the player may exchange one card, and if the player's hand then has a value of twenty-one, it is a super-blackjack that wins against the dealer's blackjack.

9. The electronically implemented method of playing a blackjack card game according to claim 8, wherein the optional discard fee is twenty percent of the player's bet, and the optional discard fee is always retained by the house, even if the player does not discard.

10. The electronically implemented method of playing a blackjack card game according to claim 8, wherein the payout to the player if he wins is:

3 to 2 if he wins with a blackjack in the first two player cards displayed, before having made any exchange;

3 to 2 if he wins with a super-blackjack, that is, a blackjack that he gets after the dealer gets a blackjack;

even money if he wins with a blackjack after making an exchange; and even money if he wins without a blackjack.

11. The electronically implemented method of playing a blackjack card game according to claim 8, wherein the player may exercise choices permitted by a host casino, selected from the group comprising doubling down and splitting pairs.

12. The electronically implemented method of playing a blackjack card game according to claim 8, wherein general guidelines for discarding are displayed to the player upon request, and said general guidelines enable the player to win the majority of his bets through optimum use of the optional discard fee.

13. An electronic machine for playing a blackjack card game, comprising:

a processor for controlling an electronic blackjack game;

a display for displaying the electronic blackjack game;

a means for accepting a bet from a player, before any cards are displayed;

a means for accepting an optional discard fee, if the player chooses to pay the optional discard fee, before any cards are displayed;

the display having a player display area that, after the player makes a bet and decides whether or not to pay the optional discard fee, displays two player cards face up, and the display having a dealer display area that at the same time displays two cards of a simulated dealer;

means for allowing the player to exchange one of his two displayed cards with remaining cards in one or more simulated decks of playing cards, if the player has paid the optional discard fee and chooses to discard the card;

means for displaying a replacement card in the player display area, if the player has discarded a card, with the card originally displayed and the replacement card counting as the player's starting hand, and counting as a blackjack if it has a value of twenty-one;

means for completing the blackjack game pursuant to preestablished rules of the blackjack game; and if the player wins, means for paying off the player pursuant to preestablished payouts;

wherein the player who has paid the optional discard fee may exchange one card only if the value of the first two player cards displayed is less than seventeen and neither card is an ace; and unless the simulated dealer's starting two-card hand is a blackjack and the player has at least one card selected from the group consisting of aces and cards with a value of ten, in which case the player may exchange one card, and if the player's hand then has a value of twenty-one, it is a super-blackjack that wins against the dealer's blackjack.

14. The electronic machine for playing a blackjack card game according to claim 13, wherein the processor and the display are located within one unit.

15. The electronic machine for playing a blackjack card game according to claim 13, wherein the processor is a server, and the processor and the display are located at a distance.

16. The electronic machine for playing a blackjack card game according to claim 13, wherein:

the optional discard fee is twenty percent of the player's bet, and the optional discard fee is always retained by the house, even if the player does not discard.

17. The electronic machine for playing a blackjack card game according to claim 13, wherein the payout to the player if he wins is:

3 to 2 if he wins with a blackjack in the first two player cards displayed, before having made any exchange;

3 to 2 if he wins with a super-blackjack, that is, a blackjack that he gets after the dealer gets a blackjack;

even money if he wins with a blackjack after making an exchange; and even money if he wins without a blackjack.

18. The electronic machine for playing a blackjack card game according to claim 13, wherein:

the player may exercise choices permitted by a host casino, selected from the group comprising doubling down and splitting pairs; and general guidelines for discarding are displayed to the player upon request, and said general guidelines enable the player to win the majority of his bets through optimum use of the optional discard fee.

* * * * *